US009209990B1

United States Patent
Szabo et al.

(10) Patent No.: US 9,209,990 B1
(45) Date of Patent: *Dec. 8, 2015

(54) METHOD AND SYSTEM FOR SCALING NETWORK TRAFFIC MANAGERS

(75) Inventors: Paul Szabo, Seattle, WA (US); David D. Schmitt, Seattle, WA (US); Ning X. Li, Sequim, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/723,567

(22) Filed: Mar. 12, 2010

Related U.S. Application Data

(63) Continuation of application No. 11/929,603, filed on Oct. 30, 2007, now Pat. No. 7,702,809, which is a continuation of application No. 10/644,692, filed on Aug. 20, 2003, now Pat. No. 7,395,349, which is a continuation-in-part of application No. 10/119,433, filed on Apr. 9, 2002, now Pat. No. 7,102,996.

(60) Provisional application No. 60/293,466, filed on May 24, 2001.

(51) Int. Cl.
*G06F 15/173* (2006.01)
*H04L 12/46* (2006.01)
*H04L 12/803* (2013.01)
*H04L 12/801* (2013.01)
*H04L 12/851* (2013.01)

(52) U.S. Cl.
CPC ............ *H04L 12/4641* (2013.01); *H04L 47/10* (2013.01); *H04L 47/125* (2013.01); *H04L 47/2441* (2013.01)

(58) Field of Classification Search
USPC ................... 709/226, 245, 238; 370/229–235
See application file for complete search history.

(56) References Cited

U.S. PATENT DOCUMENTS

| 5,884,040 | A | 3/1999 | Chung |
| 6,064,671 | A | 5/2000 | Killian |
| 6,157,950 | A | 12/2000 | Krishnan |
| 6,173,384 | B1 * | 1/2001 | Weaver .......................... 711/216 |
| 6,182,146 | B1 | 1/2001 | Graham-Cumming, Jr. |
| 6,253,230 | B1 | 6/2001 | Couland et al. |

(Continued)

OTHER PUBLICATIONS

Office Communication for U.S. Appl. No. 95/001,508, mailed Feb. 14, 2011.

(Continued)

*Primary Examiner* — Abdullahi E Salad
(74) *Attorney, Agent, or Firm* — John W. Branch; Lowe Graham Jones PLLC

(57) ABSTRACT

A method and system is directed to routing a flow of packets over a network to multiple traffic management devices. An apparatus receives each packet from a network and forwards the packet to one of a group of traffic management devices. The apparatus also may receive packets from servers for which the traffic management devices are managing communications. When forwarding packets, a traffic management device is selected from the group of traffic management devices by employing a hash of an IP address and port number. The IP address and port number are selected from source or destination information in the packet that has a greater port number. When the traffic management device performs a network address translation, further actions may be performed so that packets that are part of a flow between two network devices are delivered to the same traffic management device.

34 Claims, 9 Drawing Sheets

(56) References Cited

U.S. PATENT DOCUMENTS

| | | | |
|---|---|---|---|
| 6,263,368 | B1 | 7/2001 | Martin |
| 6,327,622 | B1 | 12/2001 | Jindal et al. |
| 6,330,602 | B1 | 12/2001 | Law et al. |
| 6,359,879 | B1 | 3/2002 | Carvey et al. |
| 6,389,448 | B1 | 5/2002 | Primak et al. |
| 6,424,992 | B2 | 7/2002 | Devarakonda et al. |
| 6,442,168 | B1* | 8/2002 | Vasa ............................. 370/401 |
| 6,453,360 | B1 | 9/2002 | Muller et al. |
| 6,493,341 | B1 | 12/2002 | Datta et al. |
| 6,546,423 | B1 | 4/2003 | Dutta et al. |
| 6,601,084 | B1 | 7/2003 | Bhaskaran et al. |
| 6,651,099 | B1 | 11/2003 | Dietz et al. |
| 6,665,702 | B1 | 12/2003 | Zisapel et al. |
| 6,742,045 | B1* | 5/2004 | Albert et al. ................... 709/238 |
| 6,775,235 | B2 | 8/2004 | Datta et al. |
| 6,788,692 | B1 | 9/2004 | Boudreau et al. |
| 6,792,461 | B1 | 9/2004 | Hericourt |
| 6,792,463 | B1 | 9/2004 | Lamberton et al. |
| 6,807,179 | B1* | 10/2004 | Kanuri et al. ............ 370/395.31 |
| 6,832,252 | B1 | 12/2004 | Cieslak et al. |
| 6,880,089 | B1 | 4/2005 | Bommareddy et al. |
| 6,909,713 | B2 | 6/2005 | Magnussen et al. |
| 6,947,410 | B1* | 9/2005 | Schwartz et al. ............. 370/352 |
| 6,980,521 | B1 | 12/2005 | Jarvis |
| 7,010,611 | B1* | 3/2006 | Wiryaman et al. ............ 709/232 |
| 7,020,713 | B1 | 3/2006 | Shah et al. |
| 7,051,066 | B1 | 5/2006 | Albert et al. |
| 7,065,569 | B2 | 6/2006 | Teraslinna |
| 7,088,710 | B1 | 8/2006 | Johnson et al. |
| 7,089,328 | B1 | 8/2006 | O'Rourke et al. |
| 7,102,996 | B1 | 9/2006 | Amdahl et al. |
| 7,769,873 | B1 | 8/2010 | Mackie |
| 7,774,473 | B2 | 8/2010 | Elving et al. |
| 8,004,971 | B1 | 8/2011 | Szabo et al. |
| 8,477,609 | B1 | 7/2013 | Amdahl et al. |
| 8,553,542 | B1 | 10/2013 | Szabo et al. |
| 2002/0062372 | A1 | 5/2002 | Hong et al. |
| 2002/0114326 | A1 | 8/2002 | Mahalingaiah |
| 2002/0138618 | A1 | 9/2002 | Szabo |
| 2003/0021230 | A1 | 1/2003 | Kuo et al. |
| 2003/0229809 | A1 | 12/2003 | Wexler et al. |
| 2004/0090919 | A1 | 5/2004 | Callon et al. |
| 2005/0008017 | A1 | 1/2005 | Datta et al. |
| 2005/0114186 | A1 | 5/2005 | Heinrich |

OTHER PUBLICATIONS

Office Communication for U.S. Appl. No. 95/001,509, mailed Feb. 14, 2011.
"Foundry ServerIron Switch Firewall Load Balancing Guide," Foundry Networks, Inc., Jun. 2003, 308 pgs.
Office Communication for U.S. Appl. No. 10/659,011, mailed Feb. 23, 2011.
Petition Under 37 C.F.R. § 1.927 to Review the Examiner's Refusal to Order Inter Partes Reexamination of U.S. Pat. No. 7,102,996, U.S. Appl. No. 95/001,511, filed Mar. 10, 2011.
Petition Under 37 C.F.R. § 1.927 to Review the Examiner's Refusal to Order Inter Partes Reexamination of U.S. Pat. No. 7,395,349, U.S. Appl. No. 95/001,510, filed Mar. 4, 2011.
Petition Under 37 C.F.R. § 1.927 to Review the Examiner's Refusal to Order Inter Partes Reexamination of U.S. Pat. No. 7,702,809, U.S. Appl. No. 95/001,508, filed Mar. 14, 2011.
Petition Under 37 C.F.R. § 1.927 to Review the Examiners Refusal to Order Inter Partes Reexamination of U.S. Pat. No. 7,697,427, U.S. Appl. No. 95/001,509, filed Mar. 14, 2011.
Order on Claim Construction (Part 1), United States District Court, Western District of Washington at Seattle; Case No. 2:10-CV-00654-MJP; filed Jul. 8, 2011.
Order on Claim Construction (Part 2), United States District Court, Western District of Washington at Seattle; Case No. 2:10-CV-00654-MJP; filed Aug. 9, 2011.
Office Communication for U.S. Appl. No. 10/659,011 mailed Mar. 29, 2011.
Decision on Petition Under 37 CFR §§ 1.927 & 1.181 of U.S. Pat. No. 7,702,809, U.S. Control No. 95/001,508, mailed Sep. 1, 2011.
Decision on Petition Under 37 CFR §§ 1.927 & 1.181 of U.S. Pat. No. 7,697,427, U.S. Control No. 95/001,509, mailed Aug. 31, 2011.
Decision on Petition Under 37 CFR §§ 1.927 & 1.181 of U.S. Pat. No. 7,395,349, U.S. Control No. 95/001,510, mailed Aug. 31, 2011.
Decision on Petition Under 37 CFR §§ 1.927 & 1.181 of U.S. Pat. No. 7,102,996, U.S. Control No. 95/001,511, mailed Aug. 31, 2011.
Official Communication for U.S. Control No. 95/001,510, mailed Nov. 14, 2011.
Official Communication for U.S. Control No. 95/001,508 mailed Dec. 10, 2011.
Official Communication for U.S. Control No. 95/001,509 mailed Dec. 9, 2011.
Official Communication for U.S. Control No. 95/001,511 mailed Dec. 16, 2011.
Official Communication for U.S. Control No. 95/001,511 mailed May 5, 2012.
Official Communication for U.S. Appl. No. 12/723,576 mailed Apr. 11, 2012.
Amendment to carrier Sense Multiple Access with Collision Detection (CSMA/CD) Access Method and Physical Layer Specifications—Aggregation of Multiple Link Segments, IEEE Std 802.3ad-2000, Mar. 30, 2000, pp. 1-173.
Thaler, D., et al, "Multipath Issues in Unicast and Multicast Next-Hop Selection" The Internet Society, Nov. 2000, pp. 1-9.
Hopps, C. "Analysis of an Equal-Cost Multi-Oath Algorithm", The Internet Society, Nov. 2000, pp. 1-8.
Moy, J., "OSPF Version 2", The Internet Society, Apr. 1998, pp. 1-53.
Hewitt, J., et al. "Securities Practice and Electronic technology," Corporate Securities Series, New York, Law Journal Seminars—Press, 1998, title page, bibliography page, pp. 4.29-4.30.
Reardon, M. "A Smarter Session Switch: Arrowpoint's CS Session Switches Boast the Brains Needed for E-Commerce," Data Communications, Jan. 1999, title page, pp. 3, 5, 18.
Official Communication for U.S. Appl. No. 10/119,433, mailed Mar. 30, 2006.
Official Communication for U.S. Appl. No. 10/119,433, mailed Jun. 14, 2006.
Official Communication for U.S. Appl. No. 10/644,692, mailed May 18, 2007.
Official Communication for U.S. Appl. No. 10/644,692, mailed Oct. 30, 2007.
Official Communication for U.S. Appl. No. 10/644,692, mailed Feb. 26, 2008.
Official Communication for U.S. Appl. No. 10/659,011, mailed Sep. 19, 2008.
Official Communication for U.S. Appl. No. 10/659,011, mailed Dec. 23, 2008.
Official Communication for U.S. Appl. No. 10/659,011, mailed May 27, 2009.
Official Communication for U.S. Appl. No. 10/659,011, mailed Dec. 28, 2009.
Official Communication for U.S. Appl. No. 10/659,011, mailed Jul. 19, 2010.
Official Communication for U.S. Appl. No. 10/659,011, mailed Oct. 5, 2010.
Official Communication for U.S. Appl. No. 11/469,843, mailed Apr. 1, 2009.
Official Communication for U.S. Appl. No. 11/469,843, mailed Nov. 17, 2009.
Official Communication for U.S. Appl. No. 11/469,843, mailed Feb. 1, 2010.
Official Communication for U.S. Appl. No. 11/929,603, mailed Aug. 25, 2009.
Official Communication for U.S. Appl. No. 11/929,603, mailed Feb. 16, 2010.
F5 Networks, Inc., Big/ip Controller Administrator Guide, Version 3.1, 2000.
F5 Networks, Inc., Big/ip Controller Reference Guide, Version 3.1, 2000.

(56) References Cited

OTHER PUBLICATIONS

F5 Networks, Inc., Big/ip Controller Release Note, Version 3.1, Apr. 28, 2000 http://support.f5.com/kb/en-us/archived_products/big-ip/releasenotes/product/relnotes3_1.

Foundry Networks, Inc., Application Note: Firewall Load Balancing with ServerIron, created Mar. 3, 2000 http://www.foundrynet.com/pdf/an-firewall-load-bal.pdf.

Foundry Networks, Inc., Foundry Products, http://www.foundrynet.com/appnotes, archived on May 10, 2000 http://replay.waybackmachine.org/20000510161749/http://www.noundrynet.com/appnotes.

Wolf et al., Design Tradeoffs for Embedded Network Processors, Washington University in St. Louis, Jul. 10, 2000.

Notice of Allowance for U.S. Appl. No. 10/659,011 mailed Dec. 23, 2010.

F5 Networks, Inc., Big/ip Controller Getting Started Guide, Version 3.1, 2000.

Request for Inter Partes Reexamination of U.S. Pat. No. 7,102,996, U.S. Appl. No. 95/001,511, filed Dec. 13, 2010.

Request for Inter Partes Reexamination of U.S. Pat. No. 7,697,427, U.S. Appl. No. 95/001,509, filed Dec. 13, 2010.

Request for Inter Partes Reexamination of U.S. Pat. No. 7,395,349, U.S. Appl. No. 95/001,510, filed Dec. 13, 2010.

Request for Inter Partes Reexamination of U.S. Pat. No. 7,702,809, U.S. Appl. No. 95/001,508, filed Dec. 13, 2010.

Office Communication for U.S. Appl. No. 95/001,511, mailed Jan. 31, 2011.

Office Communication for U.S. Appl. No. 95/001,510, mailed Feb. 4, 2011.

Official Communication for U.S. Appl. No. 13/181,418 mailed Jun. 5, 2013.

Official Communication for U.S. Control No. 95/001,508 mailed May 14, 2013.

Official Communication for U.S. Appl. No. 95/001,509 mailed Aug. 1, 2013.

Official Communication for U.S. Appl. No. 95/001,509 mailed Sep. 25, 2013.

Official Communication for U.S. Appl. No. 12/723,576 mailed Feb. 20, 2013.

Official Communication for U.S. Appl. No. 13/181,418 mailed Feb. 8, 2013.

Official Communication for U.S. Appl. No. 95/001,508 mailed Feb. 22, 2013.

Official Communication for U.S. Appl. No. 95/001,509 mailed Feb. 22, 2013.

Official Communication for U.S. Appl. No. 12/723,576 mailed Oct. 26, 2012.

Official Communication for U.S. Appl. No. 95/001,508 mailed Aug. 14, 2012.

Official Communication for U.S. Appl. No. 95/001,509 mailed Sep. 19, 2012.

Official Communication for U.S. Appl. No. 95/001,510 mailed Jul. 30, 3012.

Official Communication for U.S. Appl. No. 95/001,511 mailed Sep. 19, 2012.

Official Communication for U.S. Appl. No. 95/001,511 mailed Dec. 3, 2012.

Official Communication for U.S. Appl. No. 95/001,510 mailed May 9, 2013.

\* cited by examiner

METHOD AND SYSTEM FOR SCALING NETWORK TRAFFIC MANAGERS

CROSS REFERENCE TO RELATED APPLICATIONS

This utility patent application is a continuation of allowed U.S. patent application Ser. No. 11/929,603 filed on Oct. 30, 2007, the benefit of which is claimed under 35 U.S.C. §120, which is a continuation of U.S. patent application Ser. No. 10/644,692 filed on Aug. 20, 2003, issued as U.S. Pat. No. 7,395,349, the benefit of which is claimed under 35 U.S.C. §120, which is a continuation-in-part of U.S. patent application Ser. No. 10/119,433, filed on Apr. 9, 2002, issued as U.S. Pat. No. 7,102,996, the benefit of which is claimed under 35 U.S.C. §120, which claims priority to U.S. Provisional Patent Application No. 60/293,466 filed on May 24, 2001, the benefit of the filing date of which is claimed under 35 U.S.C. §119(e), the disclosures of which are each incorporated by reference in their entirety herein.

FIELD OF THE INVENTION

The present invention relates to computer network traffic, and in particular to distributing network traffic associated with traffic management devices.

BACKGROUND

The Internet's core bandwidth continues to double every year. Some of this additional bandwidth is consumed as more and more users access the Internet. Other additional bandwidth is consumed as existing users increase their use of the Internet. This increase of Internet use translates into an increase in traffic directed to and from World Wide Web (WWW) servers and other Internet servers.

Replacing a WWW server with a WWW server of twice the capacity is a costly undertaking. Adding additional WWW servers is less costly but generally requires a load-balancing mechanism to balance workload so that each virtual server performs work proportional to its capacity and the number of servers available to the traffic management device that is performing the load balancing.

This requirement for more sophisticated traffic management requires more processing. With a sufficient rate of requests, eventually a traffic management device may not be able to process traffic in a timely manner. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" include plural references. The meaning of "in" includes "in" and "on."

Briefly stated, the present invention is directed to a system and method for routing a flow of packets to one or more traffic management devices. The invention enables a client-side flow of packets and a server-side flow of packets in the flow of packets between a client and server to be directed to a same traffic management device. One or more distributors may be employed to route the flow of packets. As the packets are received, a distributor extracts information, such as source and destination IP addresses, and source and destination port numbers from the packet. If the source port number equals the destination port number, the distributor forwards the packet to a pre-determined traffic management device. If the source port number is greater than the destination port number, the distributor performs a hash on the source IP address and the source port number. If the source port number is not greater than the destination port number, the distributor performs the hash on the destination IP address and the destination port number. For both cases, the hash results are employed to select a destination traffic management device to forward the packet. Because, the destination traffic management device may perform a network address translation on the packet contents, the present invention may perform additional actions directed at maintaining the same relationship between the source and destination port numbers, such that a reply packet to the forwarded packet is handled by the same traffic management device.

Illustrative Operating Environment

Figure 1:
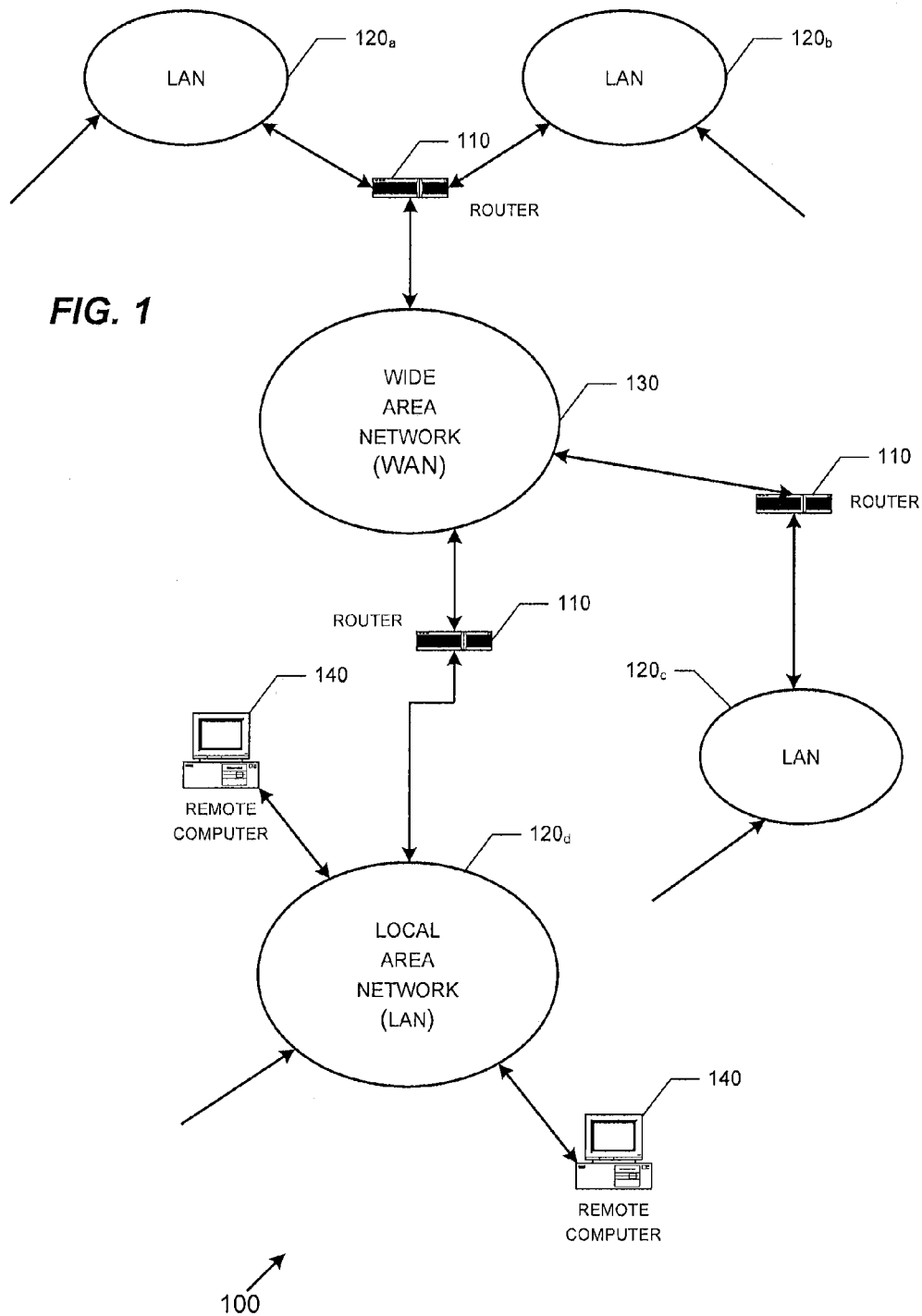
FIGS. 1-2 show components of an exemplary environment in which the invention may be practiced.
Figure 2:
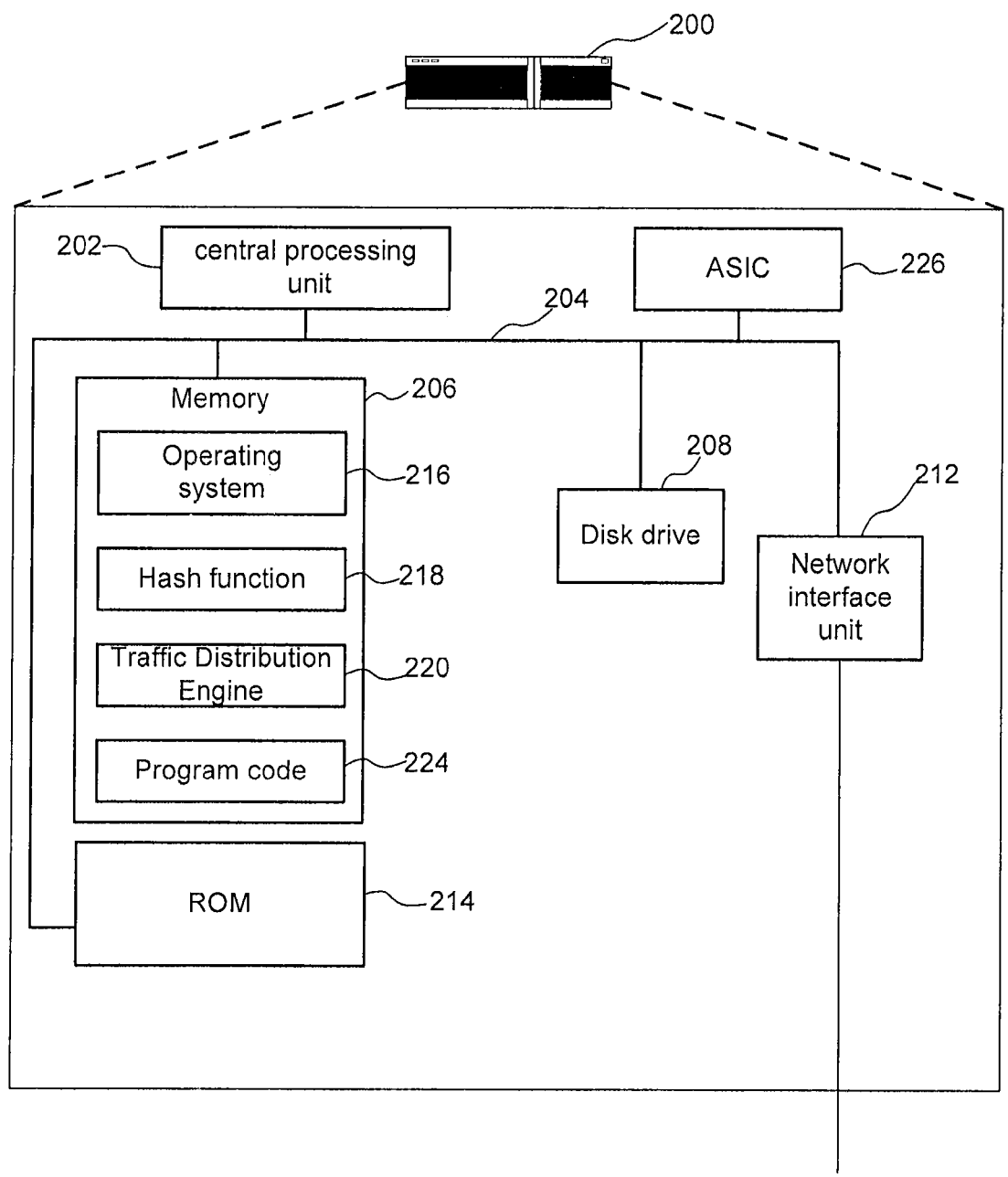

FIGS. 1-2 show components of an exemplary environment in which the invention may be practiced. Not all of the components may be required to practice the invention, and variations in the arrangement and type of the components may be made without departing from the spirit or scope of the invention.

FIG. 1 shows one embodiment of wide area network/local area network (WAN/LAN) 100, in accordance with the present invention. WAN/LAN 100 includes a plurality of local area networks ("LANs") $120_{a-d}$ and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs $120_{a-d}$ or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Remote computer 140 is any device capable of connecting with local area networks ("LANs") $120_{a-d}$ and wide area network ("WAN") 130. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, remote computer 140 may be any device that is capable of connecting using a wired or wireless communication medium such as a PDA, POCKET PC, wearable computer, or other device mentioned above that is equipped to use a wired and/or wireless communication medium.

FIG. 2 shows an exemplary network device 200 that may operate as an intermediate network device in accordance with the present invention. It will be appreciated that not all components of network device 200 are illustrated, and that network device 200 may include more or fewer components than those shown in FIG. 2. Network device 200 may operate, for example, as a router, bridge, firewall, gateway, traffic management device (also referred to as a traffic manager), distributor, load balancer, server array controller, or proxy server. The communications may take place over the network 130, the Internet, a WAN, LAN, or some other communications network known to those skilled in the art.

As illustrated in FIG. 2, network device 200 includes a central processing unit (CPU) 202, mass memory, and a network interface unit 212 connected via a bus 204. Network interface unit 212 includes the necessary circuitry for connecting network device 200 to network 130, and is constructed for use with various communication protocols including the TCP/IP and UDP/IP protocol. Network interface unit 212 may include or interface with circuitry and components for transmitting messages and data over a wired and/or wireless communications medium. Network interface unit 212 is sometimes referred to as a transceiver.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX, LINUX™, or Windows™.

In one embodiment, the mass memory stores program code and data for implementing a hash function 218, and program code and data for implementing an allocation table 220, in accordance with the present invention. The mass memory may also store additional program code 224 and data for performing the functions of network device 200.

In one embodiment, the network device 200 includes one or more Application Specific Integrated Circuit (ASIC) chips 226 connected to the bus 204. As shown in FIG. 2, the network interface unit 212 may connect to the bus through an ASIC chip. The ASIC chip 226 includes logic that performs some of the functions of network device 200. For example, in one embodiment, the ASIC chip 226 performs a number of packet processing functions, to process incoming packets. In one embodiment, the logic of the hash function 218 is performed by the ASIC chip 226. In one embodiment, the network device 200 includes one or more field-programmable gate arrays (FPGA) (not shown), instead of, or in addition to, the ASIC chip 226. A number of functions of the network device can be performed by the ASIC chip 226, by an FPGA, by the CPU 202 with the logic of program code stored in mass memory, or by a combination of the ASIC chip and the CPU.

Computer storage media may include volatile and nonvolatile, removable and non-removable media implemented in any method or technology for storage of information, such as computer readable instructions, data structures, program modules or other data. Examples of computer storage media include RAM 206, ROM 214, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 200 may also include an input/output interface (not shown) for communicating with external devices or users.

Network device 200 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 200 can also be implemented as a combination of blades and additional components in the chassis.

Illustrative Traffic Distributing Systems

Figure 3:
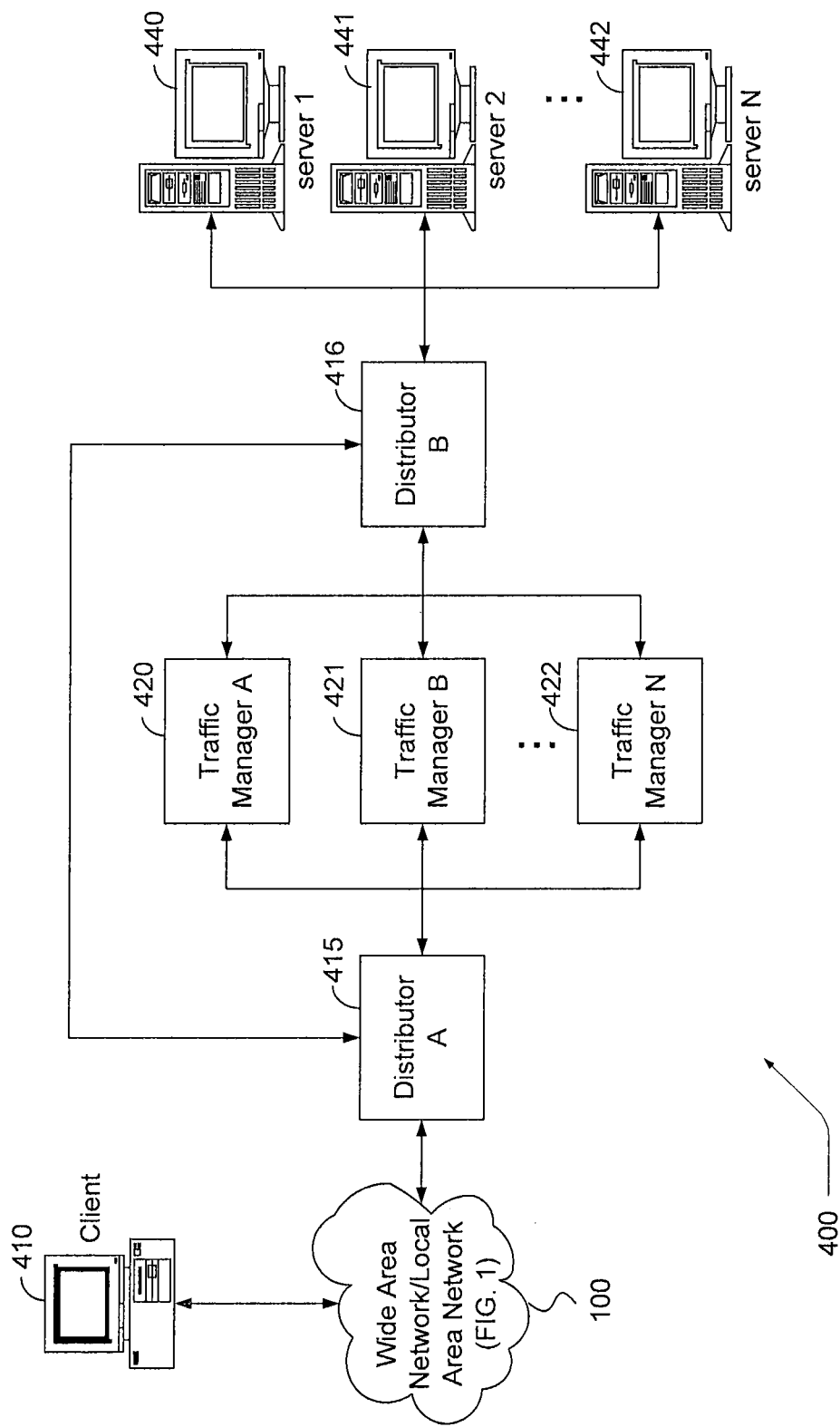
FIG. 3 illustrates an exemplary environment in which a system for distributing traffic to an array of traffic management devices operates.

FIG. 3 illustrates an exemplary environment in which a system for distributing traffic through an array of traffic management devices operates, according to one embodiment of the invention. The system includes client 410, distributors 415-416, traffic management devices 420-422, and origin servers 440-442.

Client 410 is coupled to distributor 415 over WAN/LAN 100. Distributor 415 is coupled to distributor 416 through traffic management devices 420-422. Distributor 415 also has a more direct connection to distributor 416. Distributor 416 is coupled to origin servers 440-442.

Client 410 is any device capable of connecting with WAN/LAN 100. As such, client 410 is substantially similar to remote computer 140 in FIG. 1.

Distributor 415 receives information in the form of packets. Each packet may convey a piece of information. A packet may be sent for handshaking, i.e., to establish a connection or to acknowledge receipt of data. A communication includes a group of related packets sent between two devices, such as client 410 and server 440. For example, to request a Web page, client 410 may send some packets requesting a connection, e.g., handshaking packets, server 440 may respond with other handshaking packets. Then client 410 may send a packet requesting a particular Web page. Server 440 may respond by sending data packets associated with the Web page. Finally, client 410 may end a communication by sending some more handshaking packets which server 440 may respond to with other handshaking packets. In essence, a communication may be thought to include all packets needed or necessary for a transaction to occur. A communication or part of a communication may also be referred to as a flow or as a flow of packets.

As described above, a flow may include a bi-directional flow of packets. Bi-directional packet flows include packets sent from a client, such as client 410, that are destined for a server, such as origin server 440, and those packets sent from the server to the client. A flow of packets may also include related packet flows, such as a control packet flow and a data packet flow that may arise during a File Transfer Protocol (FTP) session, or the like. A flow of packets might further include IP fragments that may arise either at the original sender of the packets, or at any intermediate device along a communication path.

A packet may come from various senders including client 410, traffic management devices 420-422, distributor 416, or origin servers 440-442. The packet may include information such as a request, response, or configuration command. Generally, packets received by distributor 415 will be formatted according to TCP/IP, but they could also be formatted using another transport protocol, such as User Datagram Protocol (UDP), Internet Control Message Protocol (ICMP), NETbeui, IPX/SPX, token ring, and the like. Upon receipt of a packet, a transcoder (not shown) associated with distributor 415 makes a determination as to where the packet should go. The transcoder may be logic circuitry or software executing on an electronic device, such as a processor, within distributor 415, or it may execute or reside elsewhere.

In one embodiment, the transcoder includes traffic distribution engine 224 shown in FIG. 2. The transcoder may access a database, a table, or other information to determine an action to perform upon receipt of a packet, or it may be "hard-wired" to perform a certain action depending pre-defined conditions. In some senses, the transcoder may be viewed as the "brains" of distributor 415 or as logic, which drives the operation of distributor 415. In future references to distributors, the word transcoder may or may not be used. Furthermore, a distributor may be referred to as making decisions or determinations, but it should be understood in such references that a transcoder associated with the distributor is making the decisions or determinations and causing the distributor to take action appropriately.

A user on client 410 may request, for example, a Web page associated with a URL, such as http://www.uspto.gov. If this is a Web page that is serviced by origin servers 440-442, distributor 415 forwards the request to one of traffic management devices 420-422. A user on client 410 may request communication specifically with one of the traffic managers. In this case, distributor 415 forwards the request to the specified traffic manager. For example, the user may wish to configure the traffic management device, install new software, provide maintenance, or some other activity. The user may wish to configure distributor 415. In this case, distributor 415 processes the communication itself. Distributor 415 may receive a response to a previous request from one of traffic management devices 420-422. Distributor 415 may then forward this request to the recipient by sending it to WAN/LAN 100. A user may send a message directed specifically at one of origin servers 440-442. In this case, distributor 415 may send the message to distributor 416 for relaying the message to the specified server.

When requests for content come to distributor 415, the distributor may be required to ensure that a request from the same source is sent through the same traffic management device. Distributor 415 (and 416) may employ a variety of techniques to ensure that the request is from the same source is sent through the same traffic management device. For example, distributor 415 (and 416) may employ such techniques as are described in U.S. patent application Ser. No. 10/119,433, filed Apr. 9, 2002, entitled "Method and System for Scaling Network Traffic Managers," which is hereby incorporated by reference.

Distributor 415 may extract information from the request to select the traffic management device. By dynamically employing the extracted information for each request, distributor 415 need not maintain state information about the connections between origin servers 440-442 and requestors, such as client 410. Distributor 415 may select the traffic management device and forward requests by performing actions described below in conjunction with FIG. 8.

Sometimes, when distributor 415 receives a packet, it acts like a router or switch, forwarding the packet toward the intended recipient. For example, distributor 415 may receive a request to connect with server 440. Distributor 415 may forward this request to distributor 416 for forwarding to server 440. Distributor 415 may receive a packet from distributor 416 or from traffic management devices 420-422 that is directed at a client, such as client 410. In this case, distributor 415 forwards the packet to WAN/LAN 100 (or a router thereon). Alternatively, if client 410 is a device distributor 415 is more closely connected to, distributor 415 may send the message directly to client 410.

Distributor 415 may use a different algorithm for forwarding messages directed towards traffic management devices 420-422 than for messages from traffic management devices 420-422. For example, when messages are directed at traffic management devices 420-422, distributor 415 may perform a hash on either a source or destination IP address and port number to determine to which traffic management device the message is to be sent. When distributor 415 receives a message from a traffic management device, however, it may forego applying a hash.

A hash is a function or algorithm that maps a set of input values to a set of output values. Typically, a hash is used when the set of input values has more elements than the set of output values. Some hashes when applied to a set of input values will map the input values approximately equally over the set of output values. Other hashes will map the input values disproportionately to a set of output values. For example, one traffic management device may be able to deal with twice as many packets as another traffic management device. A hash could be constructed to map input packets to the one traffic management device twice as often as mapping packets to the other traffic management device. Generally, a hash is deterministic. That is, the hash will produce the same output value whenever a particular input value is hashed on.

Traffic management devices 420-422 receive messages sent from distributors 415 and 416. In some operations, traffic management devices 420-422 act like level 7 switches. That is, they may look at content associated with higher TCP/IP layers of the message, e.g. a request for a page such as http://www.uspto.gov/ and information that identifies the user, such as a cookie, etc. They may store information in memory so that next time the requestor requests more information from http://www.uspto.gov/, each request is sent to the same server. They may do this, in part, to ensure that the user is connected to the server that the user previously connected to. This helps prevent the loss of transaction data, such as items in a shopping cart.

In addition, traffic management devices 420-422 may perform network address translation (NAT). That is, in a TCP/IP packet, they may change the source and/or destination field. This may be done for many reasons. One reason is that each traffic management device is configured to cause future communications to and from a server to flow through the traffic management device, so that the traffic management device may maintain state information about the connection. The traffic management device may need state information to gracefully close a connection if, for example, the server fails. In addition, the traffic management device may need state information to reroute a connection to another server if the server fails. Another reason the traffic management device may be configured to have all future communications flow through it is for security purposes.

When traffic management devices 420-422 perform a network address translation, a relationship between the source and destination field may change. For example, a source port number that was originally less than a destination port number, may now be greater. Such a change in the relationship between the port numbers may affect which traffic management device the reply is sent. This may result in a different traffic management device being selected to handle the reply than was selected to handle an initial client request. Therefore, traffic management devices 420-422 may need to perform actions such as those described below in conjunction with FIG. 9 to ensure that the same traffic management device handles packets in the same flow of packets.

Traffic management devices, such as traffic management devices 420-422, are any devices that manage network traffic. Such devices include, for example, routers, proxies, firewalls, load balancers, devices that perform network address translation, any combination of the preceding devices, and the like. A traffic manager may, for example, control the flow of data packets delivered to and forwarded from an array of application servers, such as Web servers. A traffic manager may direct a request for a resource to a particular Web server based on network traffic, network topology, capacity of the server, content requested, and a host of other load balancing metrics. A traffic manager may receive data packets from and transmit data packets to the Internet, an intranet, or a local area network accessible through another network. A traffic manager may recognize packets that are part of the same communication, flow, and/or stream and may perform special processing on such packets, such as directing them to the same server so that state information is maintained. A traffic manager may support a wide variety of network applications such as Web browsing, email, telephony, streaming multimedia, and other traffic that is sent in packets.

A traffic management device may be implemented using one or more personal computers, POCKET PCs, wearable computers, multiprocessor systems, microprocessor-based or programmable consumer electronics, network PCs, cell phones, smart phones, pagers, walkie talkies, radio frequency (RF) devices, infrared (IR) devices, CBs, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An exemplary device that could be used as a traffic management device is server computer 200 of FIG. 2, configured with appropriate software. A traffic management device may have multiple network interface units and each network interface unit may interface with one or more networks. It should be understood that traffic manager as it is used in this document means traffic management device.

Distributor 416 receives communications and forwards them to one or more of origin servers 440-442, to distributor 415, or to traffic management devices 420-422. When forwarding messages to traffic management devices 420-422, distributor 416 may hash on the IP address and port number of either the destination or source, depending on which is greater, so that the same traffic management device that sent a packet to a server receives the server's response. Distributor 416 may perform actions described below in conjunction with FIG. 8 to select the traffic management device. Distributor 416 may act as a switch or router in relaying messages to intended recipients. Although distributor 416 is shown as having one shared communications link (segment) going between it and origin servers 440-442, it may have dedicated communications links to each of origin servers 440-442.

Origin servers 440-442 may include one or more WWW servers, such as network device 200 of FIG. 2, or other general-purpose servers. Origin servers 440-442 may serve content for more than one vendor. For example, a group of vendors may each run their Web sites using one or more origin servers 440-442. Origin servers 440-442 may perform other services besides serving Web pages.

Figure 4:
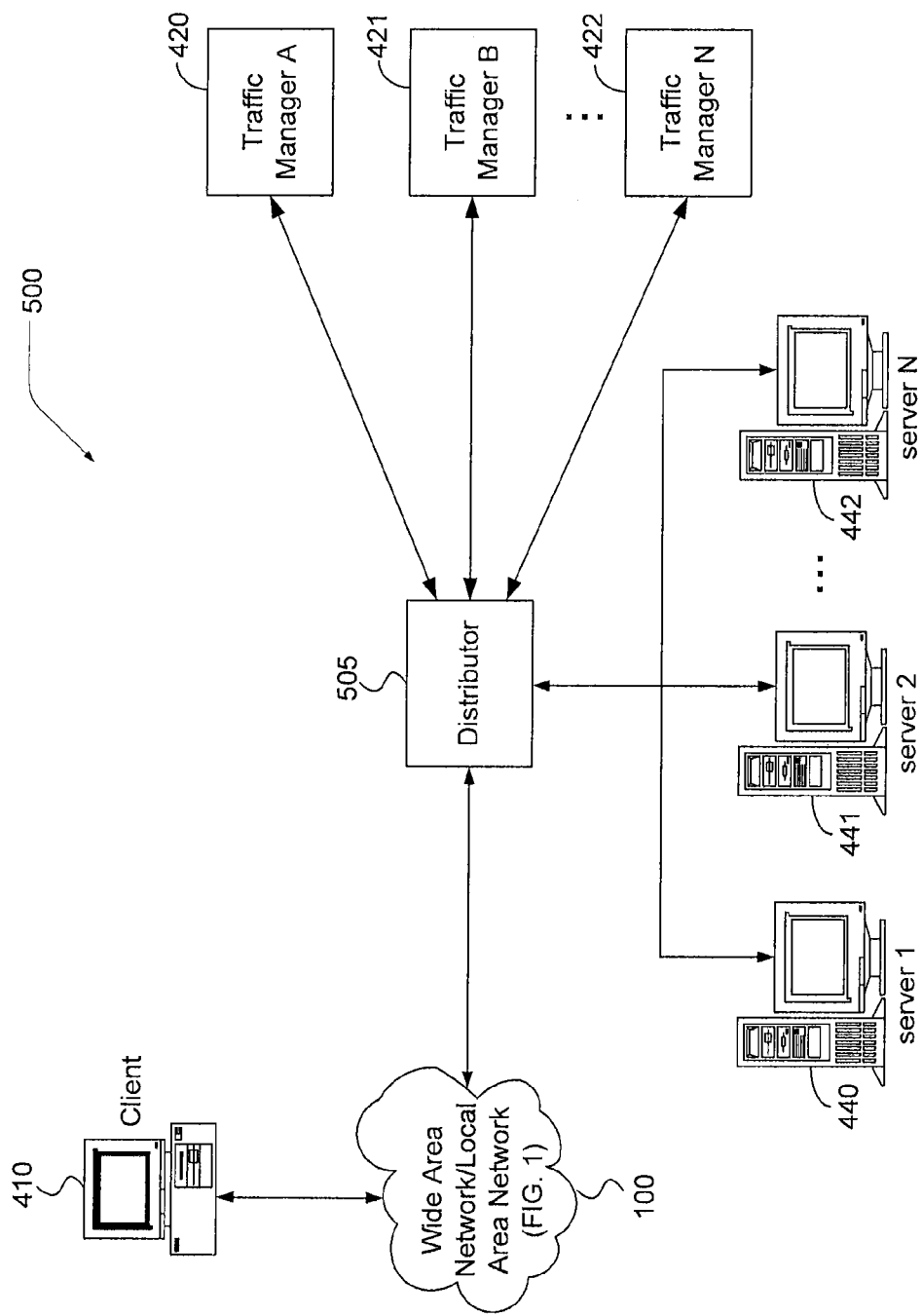
FIG. 4 shows another exemplary environment in which a system for distributing traffic to an array of traffic management devices operates.

FIG. 4 shows another exemplary environment in which a system for distributing traffic through an array of traffic management devices operates, according to one embodiment of the invention. The system includes client 410, distributor 505, traffic management devices 420-422, and origin servers 440-442.

Client 410 is coupled to distributor 505 over WAN/LAN 100. Distributor 505 is coupled to traffic management devices 420-422 and origin servers 440-442.

Components numbered similarly to those in FIG. 3 operate similarly. A difference between the environment shown in FIG. 4 and that shown in FIG. 3 is that the functionality of distributors 415-416 has been combined in distributor 505. In addition, distributor 505 is shown as having dedicated communication links (segments) to each of origin servers 440-442. It will be understood that distributor 505 may also be configured to have more than one traffic management device connected to each communication link.

Similarly, although FIG. 4 shows each of origin servers 440-442 sharing a communications link, each server may be placed on its own dedicated communication link or paired with one or more other servers without departing from the spirit or scope of the invention.

In general, distributor 505 operates logically like the combination of distributors 415 and 416. Inter-distributor messages, e.g. ones sent directly from distributor 415 to distributor 416, are no longer necessary with distributor 505. A packet that is sent from client 410 addressed to a server, such as server 440, may be routed to the server rather than passing through a traffic management device or a second distributor. Likewise, a packet sent from a server to the client may be forwarded to the client from the distributor rather than passing the packet through a traffic management device or a second distributor.

The configuration of FIG. 4 may be used for various reasons including to lower costs (of providing two distributors) or because a system does not need the capacity of two distributors.

Figure 5:
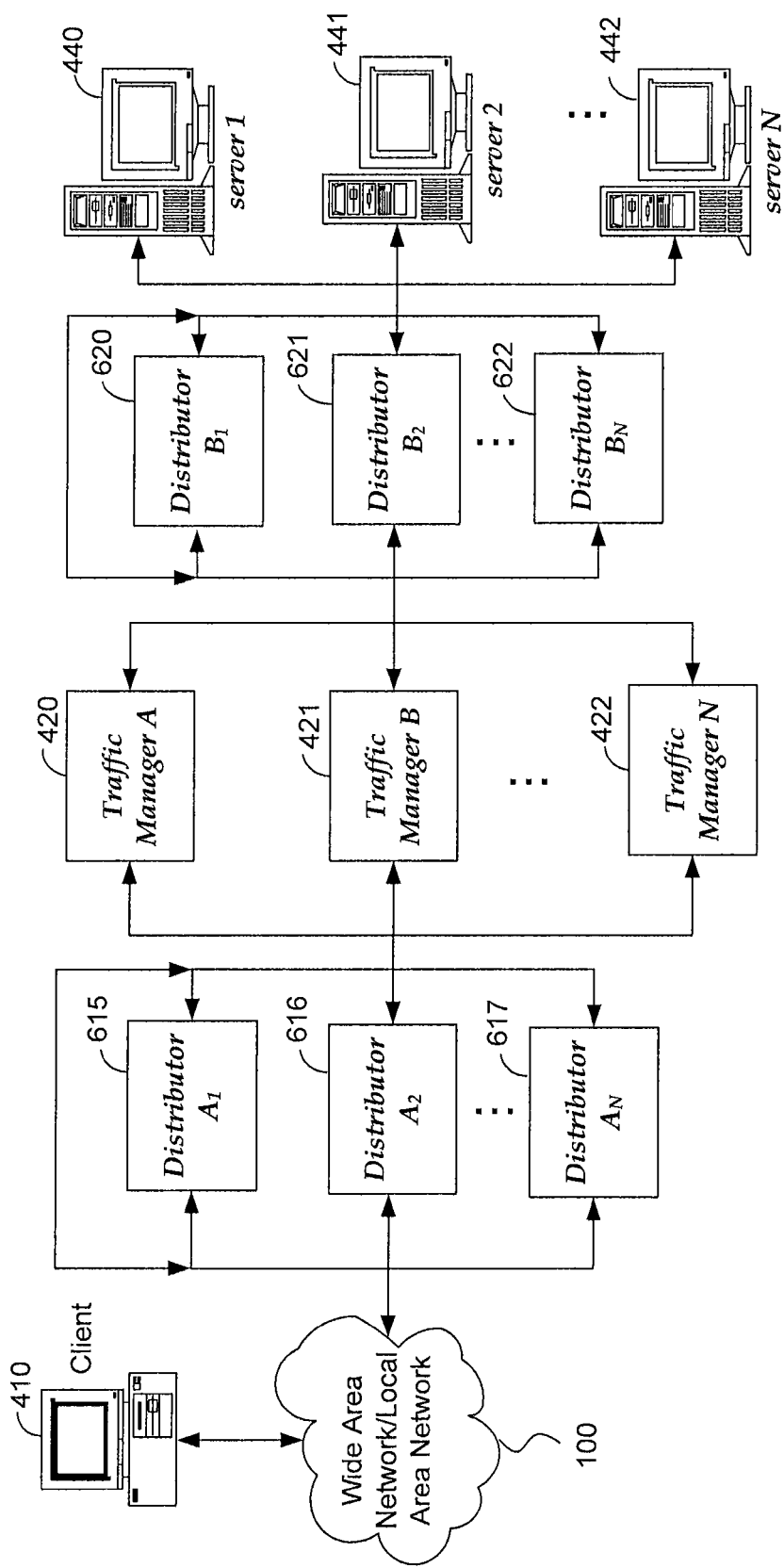
FIG. 5 shows yet another exemplary environment in which a system for routing traffic through an array of traffic management devices operates.

FIG. 5 shows yet another exemplary environment in which a system for routing traffic through an array of traffic management devices operates, according to another embodiment of the invention. The system includes client 410, distributors 615-617 and 620-622, traffic management devices 420-422, and origin servers 440-442.

Client 410 and distributors 615-617 are each coupled to each other over WAN/LAN 100. Distributors 615-617 are coupled to each other. Distributors 620-622 are coupled to each other. In one embodiment, distributors 620-622 are coupled serially to each other. In another embodiment, distributors 615-617 are also coupled serially to each other.

Components numbered similarly to those in FIG. 3 operate similarly. A difference between the environment shown in FIG. 5 and that shown in FIG. 3 is that the functionality of distributors 415 and 416 are distributed across distributors 615-617 and distributors 620-622, respectively, in a manner that provides for link aggregation. Link aggregation may be viewed as a binding together of two or more data channels into a single data channel that appears as a single, higher-bandwidth logical link. Such link aggregation is sometimes referred to as load balancing of multiple communication links since traffic loads may be distributed across multiple links to one or more distributors (615-617, and 620-622). In general, link aggregation enables distributors 615-617 (and 620-622) to provide for asymmetric level 2, and level 3-packet routing.

Figure 6:
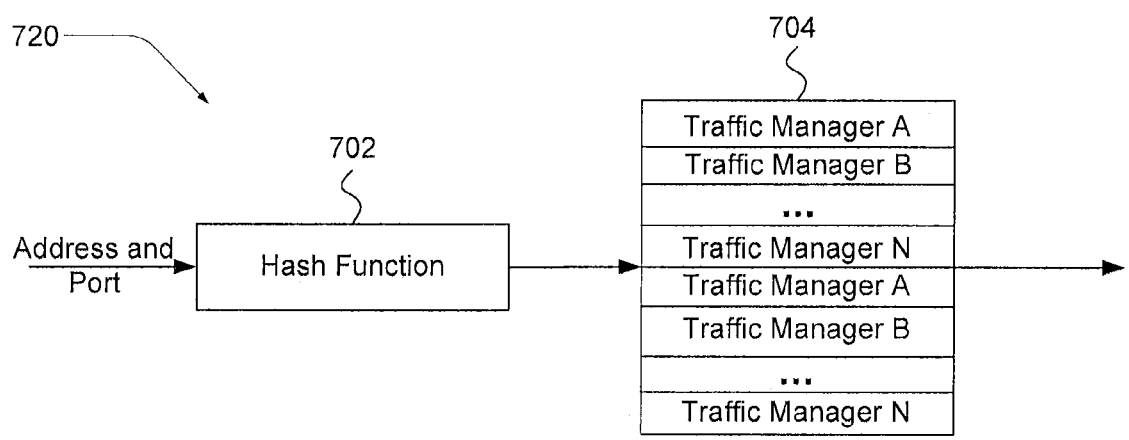
FIG. 6 shows one embodiment of a statistical traffic distributor (STD)

FIG. 6 shows one embodiment of a statistical traffic distributor (STD), in accordance with the present invention. As shown in the figure, STD 720 includes hash function 702 and allocation table 704. Hash function 702 is coupled to allocation table 704. Briefly, STD 720 operates to receive a combination of IP address and port number and provide an identifier associated with a destination traffic management device. STD 720 is further arranged to provide a pre-determined distribution profile that enables a distributor to statistically load balance traffic management devices. Moreover, STD 720 operates to allow the distribution profile to be dynamically changed with minimal disruption to existing flows of packets. STD 720 may be deployed as set of software actions, functions, and the like, deployed in hardware, and a combination of hardware and software.

Hash function 702 is arranged to distribute its integer output of hash keys uniformly, typically between 0 and N−1, where N is the number of available entries in allocation table 704. Hash function 702 may be implemented in software, hardware, or a combination of software and hardware. While virtually any hash function may be employed, some are known to provide weak distributions, e.g. a cyclical redundancy check (CRC) function. In one embodiment, an input to hash function 702 includes 144-bits (e.g. for a 128-bit IP version 6 address plus a 16-bit port number).

Allocation table 704 includes a table, list, file, database, or the like, of entries. Each entry includes an identifier associated with an available traffic management device. The arrangement of entries enables traffic to be load balanced across the available traffic management devices. For example, as shown in FIG. 6, traffic management devices A through N are allocated at least twice to entries in allocation table 704. In one embodiment of the present invention, allocation table 704 includes $2^{12}$, or 4096 entries, thereby enabling increased granularity and flexibility for allocating loads across traffic management devices. For example, traffic management devices may be allocated to entries based on a desired frequency of use for a given traffic management device.

Allocation table 704 may be configured to reshape the uniform distribution of the hash keys produced by hash function 702 to meet a pre-determined statistical traffic distribution profile. The pre-determined statistical traffic distribution profile may include, but is not limited to, a uniform, Gaussian, and Rayleigh distributions.

STD 720 may also be employed to determine self-source port numbers for a given IP address. Briefly, for a given traffic management device ID and IP address combination, a self-source port number is that port number that enables the determination of the targeted traffic management device. That is, when a traffic management device performs an address and/or port translation of the source fields, destination fields, or both, the resulting port number is the self-source port number that enables the selection of the targeted traffic management device such that the flow of packets in both directions are handled by the same traffic management device. To determine the self-source port number, STD 720 may be solved iteratively. That is, STD (IP address, X)=target traffic management device ID is iteratively solved for X, where X is the self-source port number to be found.

Figure 7:
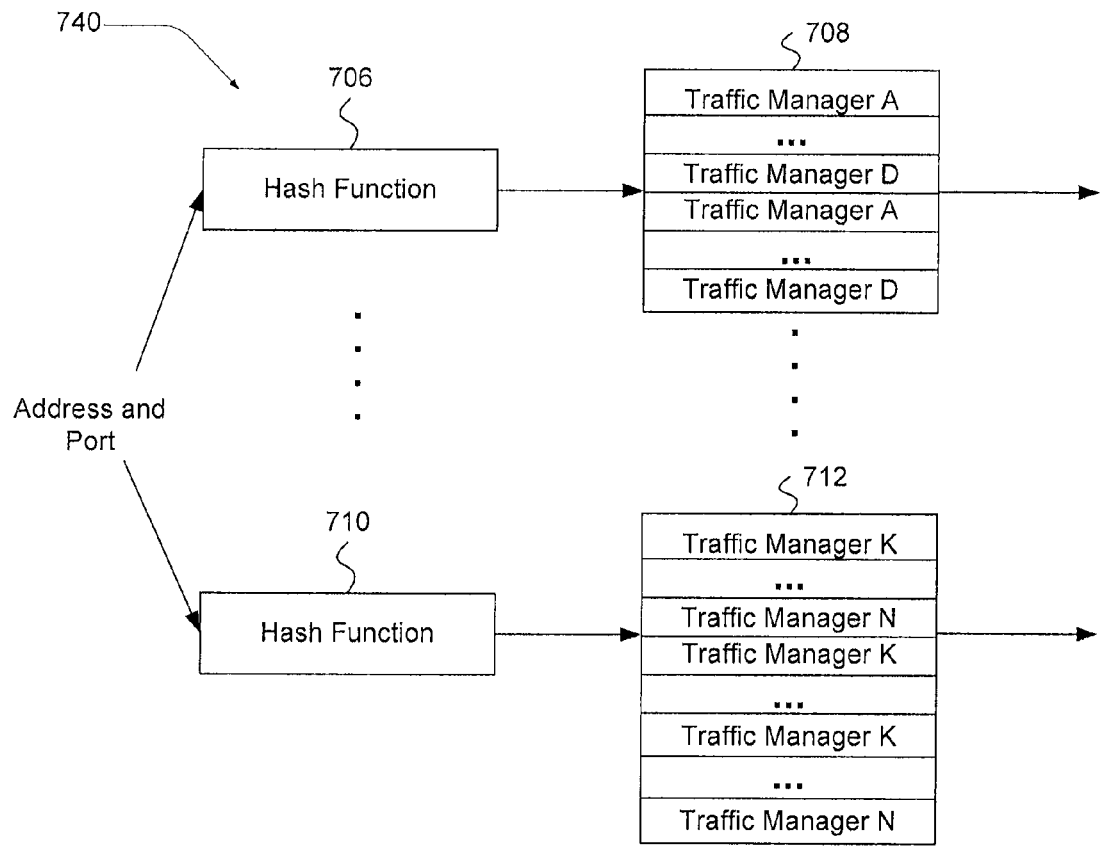
FIG. 7 shows another embodiment of a statistical traffic distributor (STD)

FIG. 7 shows another embodiment of a statistical traffic distributor (STD), in accordance with the present invention. As shown in the figure, STD 740 includes hash functions 706-710, and allocation tables 708-712. Hash function 706 is coupled to allocation table 708. Hash function 710 is coupled to allocation table 712. Allocation table 708 includes identifiers associated with traffic management devices A-D, and allocation table 712 includes identifiers associated with traffic management devices K-N. STD 740 may include many more components than those shown. The components shown, however, are sufficient to disclose an illustrative embodiment for practicing the invention.

STD 740 is configured to enable partitioning or grouping of traffic management devices, based on pre-determined criteria. For example, Secure Sockets Layer (SSL) packets may be processed through hash function 706 and allocation table 708, while non-SSL packets are processed through hash function 710 and allocation table 712. By partitioning packets based on pre-determined criteria, traffic management devices may be allocated and load-balanced based on packet types, events, or the like.

Illustrative Method of Distributing Traffic

Figure 8:
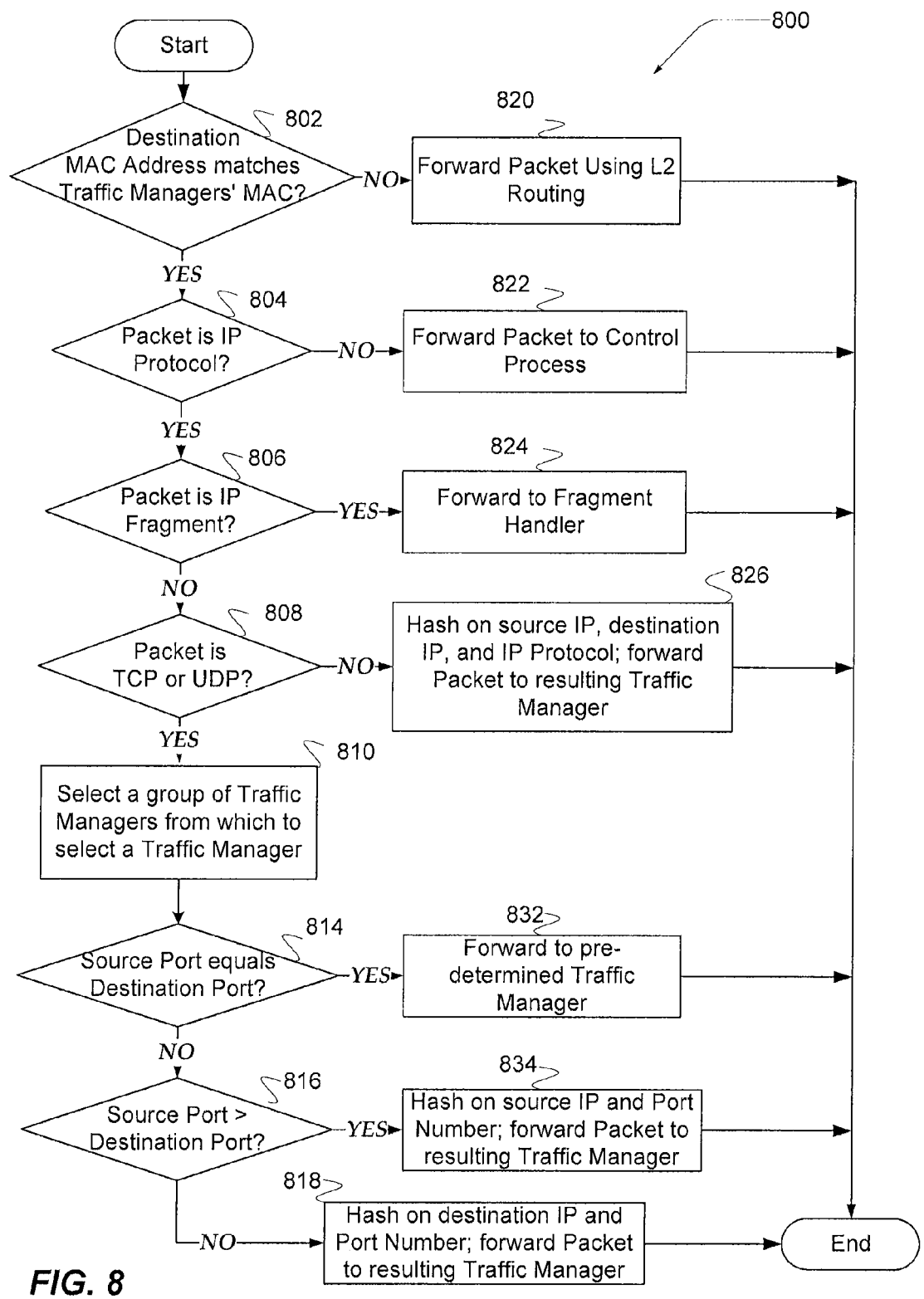
FIG. 8 illustrates a flow chart for a process for determining how to forward packets.

The operation of certain aspects of the present invention will now be described with respect to FIGS. 8-9. FIG. 8 illustrates a flow chart for a process for determining how to forward packets, in accordance with one embodiment of the invention. Process 800 is directed towards selecting a traffic management device such that a flow of packets from a given client flows through the same traffic management device, in both directions of the packet flow. Process 800 may operate for example, in distributors 415-416 of FIG. 3.

Process 800 begins, after a start block, at block 802, when a distributor receives a packet from a client. At block 802, a determination is made whether a destination media access control (MAC) address associated with the received packet matches the MAC address associated with a group of traffic management devices to be load balanced. If MAC addresses do not match, then the received packet is intended for another destination, and processing branches to block 820; otherwise, processing continues to decision block 804. At block 820, the received packet is forwarded to another destination using a level-2 mechanism, such as bridging. Upon completion of the actions at block 820, process 800 ends.

At decision block 804, a determination is made whether the received packet is of an IP protocol. For example, the received packet may be an address resolution protocol (ARP) packet that is not intended for the group of traffic management devices. If the received packet is other than an IP protocol, processing branches to block 822; otherwise, processing continues to decision block 806. At block 822, the received packet is forwarded by another process. In one embodiment, the other process includes a control processor that is arranged to handle ARP traffic, ping traffic, and the like. The control processor may be integrated into an existing system, such as distributor 415, a traffic management device such as traffic management device 420 of FIG. 3, or a separate system (not shown in FIG. 3). Upon completion of actions at block 822, process 800 ends.

At decision block 806, a determination is made whether the received packet is a packet fragment. When an IP datagram is fragmented into packets for transmission through a network, each packet fragment may operate substantially as a unique packet, with its own header. Typically, the first packet in the IP datagram includes the IP source and destination addresses, while subsequent packets may include references, or offsets, to the first packet. Thus, packet fragments may involve additional processing. Thus, if the received packet is a packet fragment, processing branches to block 824; otherwise, processing continues to block 808. At block 824, the packet fragments are forwarded to a fragment handler that may reassemble, or otherwise handle the packet fragments. Upon completion of the actions at block 824, process 800 ends.

At decision block 808, a determination is made whether the received packet is of type TCP or UDP Protocol type. For example, the received packet may be an Internet Control Message Protocol (ICMP) type Internet Group Management Protocol (IGMP) type, or the like. Such packet types may include one source and destination address. Therefore, if the received packet is not a TCP or UDP packet type, processing branches to block 826; otherwise, processing continues to decision block 810.

At block 826, a hash is performed on the source IP address, destination IP address, and the 8-bit protocol field in the received packet. The output of the hash may be employed using STD 720 of FIG. 6 to determine a traffic management device to which the received packet is forwarded. Upon completion of the actions at block 826, process 800 ends.

At block 810, a determination is made whether the traffic management devices have been partitioned into groups based on a pre-determined criterion. For example, all SSL packet traffic might be allocated to one group of available traffic management devices and non-SSL packet traffic to another group of available traffic management devices. If partitioning is employed, additional information may be associated with the packet so that different STDs are employed in subsequent actions. After block 810, processing continues to decision block 814.

At decision block 814, a determination is made whether the source port number equals the destination port number in the received packet. A source port number may equal a destination port number in a variety of situations, including, but not limited to, a DNS packet, a UDP packet, a Server Message Block (SMB) protocol, and the like. If the source and destination port numbers are equal, processing branches to block 832; otherwise, processing continues to decision block 816. At block 832, the received packet is forwarded to a pre-determined traffic management device. Upon completion of the actions at block 832, process 800 ends.

At decision block 816, a determination is made whether the source port number is greater than the destination port number in the received packet. If the source port number is greater, then processing branches to block 834; otherwise, processing branches to block 818. For example, if the received packet is from a client destined to a server, and the client port number is 6900, with a server port number of 80, then processing branches to block 834. In this example, if the received packet is from the server destined for the client, processing branches to block 818.

At block 818, a hash is performed on the destination IP address and the destination port number, as described above in conjunction with FIG. 6-7. The results of the hash function provide an identifier associated with the target traffic management device. The received packet is forwarded to the target traffic management device. Upon completion of the actions at block 818, process 800 ends.

At block 834, a hash is performed on the source IP address and the source port number, as described above in conjunction with FIG. 6-7. The results of the hash function provide an identifier associated with the target traffic management device. The received packet is forwarded to the target traffic management device. Upon completion of the actions at block 834, process 800 ends.

Although process 800 employs a comparison of port numbers to determine which address to hash on, the present invention is not so limited. Recall that the invention is configured to ensure that a packet flow between a given client and server passes through the same traffic management device, in both directions of the packet flow. As such, virtually any common values, fields, and the like, in both types of the packets (e.g., packets flowing from a client, and packets flowing from a server) may be selected. In process 800, the common values include a client address, which may be within source information or destination information of a received packet. However, another common value may be selected without departing from the scope or spirit of the present invention. For example, a pad bit in the packet may be employed. A common value, or combination of common values, may be used even when the common values appear in different respective fields within packets flowing from a client or a server. Furthermore, in one aspect of the invention, the common values may be determined by extracting one or more fields from the packet, and performing a test based on the field contents to determine the proper common values to use. For example, as described above, a test of which of the source or destination port number is greater may be used to determine whether to use the source address or the destination address as the common values.

Moreover, while forwarding the received packet in process 800 is based in part on a comparison of port numbers, the invention is not so limited. For example, a hash of the common values may be employed, to determine how to route the received packet.

Figure 9:
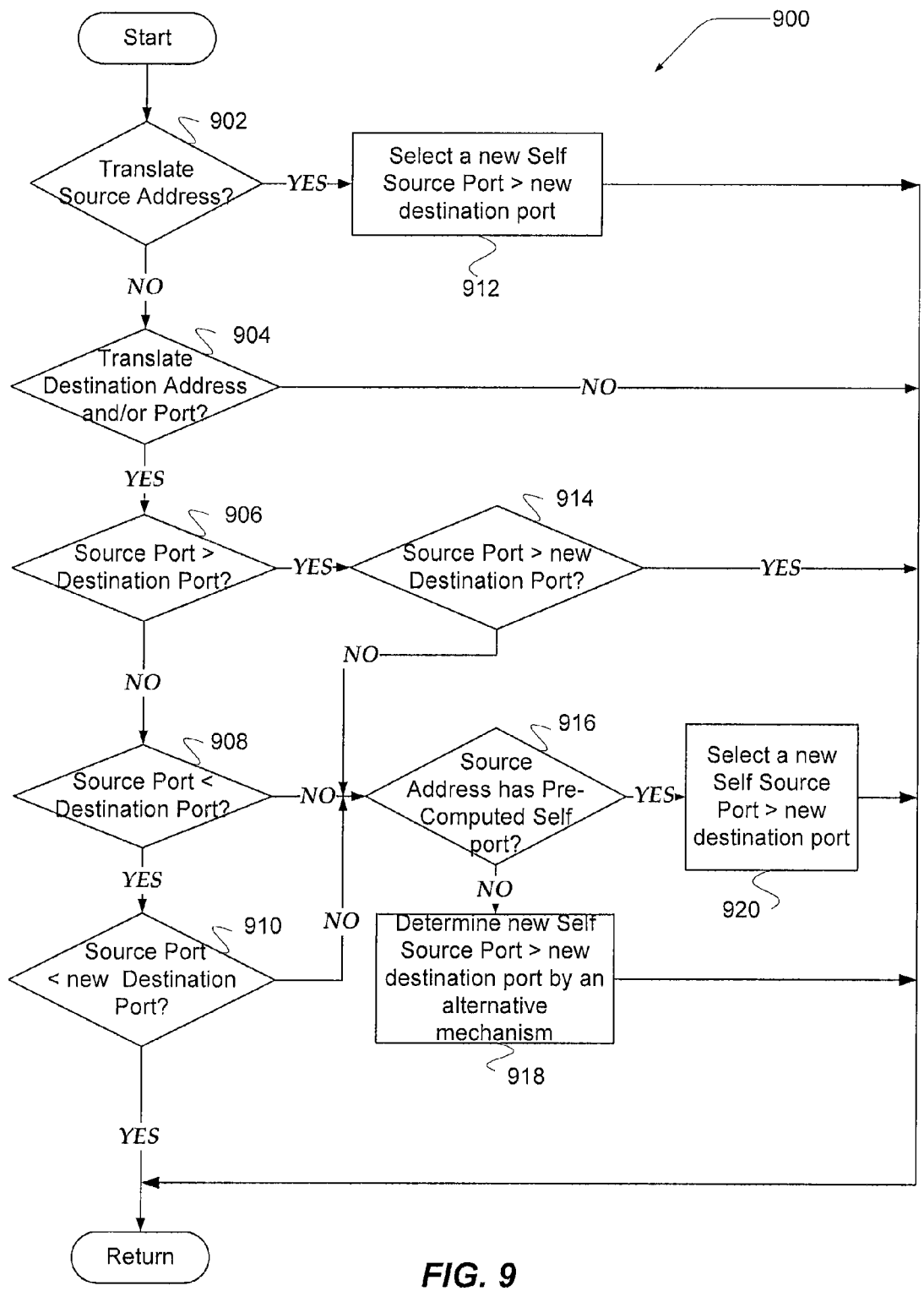
FIG. 9 shows a flow chart for managing target port number selection, in accordance with the present invention.

FIG. 9 shows a flow chart for maintaining traffic management device selection, in accordance with one embodiment of the invention. Process 900 may operate in traffic management devices 420-422 of FIG. 3. Moreover, process 900 may be employed when a traffic management device performs a network address translation on the received packet. As noted earlier, changes to a packet's IP address and/or port number could affect the process flow described in conjunction with FIG. 8. Therefore, process 900 provides one embodiment for ensuring that the same traffic management device is selected to forward a reply packet that was selected to forward the client's initial packet during a network address translation.

Process 900 begins, after a start block, at block 902, when a traffic management device initiates a server-side packet flow. At block 902, a determination is made whether a network address translation is to be performed on the source IP address in the received packet. Such a determination may be based in part on a configuration setting of the traffic management device, a type of traffic management device, and the like. If affirmative, processing branches to block 912; otherwise, processing continues to decision block 904.

At block 912, a new self-source port number is selected from a pre-computed self-source port table for the translated source IP address, such that the new self-source port number is greater than a new destination port number. The pre-computed self-source port table may be configured during an initial system configuration, and the like. In one embodiment, an inverse of STD 720, described above in conjunction with FIG. 6, may be employed to generate the self-source port table with each entry representing a possible IP address, with some port number X, such that STD (IP address, X)=target traffic management device ID. As an example, assume that a source port number from a NAT-able client packet is 6900, and the server port number is 80, with a virtual port number of 80. Then, at block 912, the new a self-source port number that is greater than 80 is selected using the pre-computed self-source port table. If a new self-source port number is not found, then a variety of mechanisms may be employed, including, but not limited to, dropping the network connection, try another source IP address, and the like. In any event, upon completion of the actions at block 912, processing returns to a calling process to perform other actions.

At decision block 904, a determination is made whether a network address translation is to be performed on the destination IP address and/or destination port number. Such a determination may be based in part on a configuration setting of the traffic management device, a type of traffic management device, and the like. If a network address translation is not to be performed, the processing returns to a calling process to perform other actions; otherwise, processing continues to decision block 906.

At decision block 906 a determination is made whether the source port number in the received packet is greater than the destination port number in the received packet. If the source port number is greater, processing branches to decision block 914; otherwise processing continues to decision block 908.

At decision block 914, a determination is made whether the source port number is greater than the new destination port number. If the source port number is greater, then the reply packet is anticipated to be forwarded to the same traffic management device that handled the client's initial packet in the flow of packets. Thus, if the source port number is greater, processing returns to the calling process to perform other actions; otherwise, processing branches to block 916.

At block 908, a determination is made whether the source port number is less than the destination port number. If the source port number is not less, processing branches to decision block 916; otherwise, processing branches to decision block 910.

At decision block 910, a determination is made whether the source port number in the received packet is less than the new destination port number. If the source port number is less, processing returns to the calling process to perform other actions; otherwise, processing branches to block 916.

At decision block 916, a determination is made whether the received packet has a pre-computed source self port number. If the source address includes a pre-computed self-source port number, processing proceeds to block 920; otherwise, processing continues to block 918.

At block 918, a new self-source port number is determined that is greater than the new destination port number. For example, given a client with a source port number of 6900, and a virtual port number of 80, with a server port number of 8080, block 918 determines a new self source port number that is greater than 8080. In one embodiment, block 918 solves the STD iteratively for a new self source port number. Because this determination may be expensive, one embodiment includes a pre-constructed table that comprises frequently seen IP addresses. Upon completion of block 918, processing returns to the calling process to perform other actions.

At block 920, a new self-source port number is selected from a pre-computed table such that the selected port number is greater than the new destination port number. For example, given a client port number of 6900, a virtual port number of 80, and a server port number of 80, a self source port number would be selected that is greater than 80. Thus, for traffic from the client, process 800 in FIG. 8 would result in a hash performed on the destination IP and port number (block 818). Traffic from the server, in this example, would also result in a hash performed on the destination IP and port number (block 818), because 80 would be less than the selected new self-source port number. Upon completion of block 918, processing returns to the calling process to perform other actions.

While processes 800-900 employ destination and source port numbers to forward a packet, the invention is not so limited. Virtually any common information associated with a client-side and a server-side packet flow may be employed to forward the packets, such that both flows of packets are directed to the same traffic management device, without departing from the scope or spirit of the invention.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A distributor device that routes packets between network devices, comprising:
   memory for storing computer-readable instructions; and
   a processor that executes the computer-readable instructions to perform actions, including:
      receiving a packet over a high bandwidth logical link in a network, wherein the logical link is based on an aggregation of two or more data channels network that are binded together into a single data channel to provide asymmetric level 2 and level 3 packet routing;
      when a source port number of the received packet equals a destination port number of the received packet, forwarding the received packet to a predetermined traffic manager;
      when the source port number differs from the destination port number, determining a target traffic manager based on at least a first field in the received packet for packets received from a first network device by hashing at least the first field in the received packet and employing a first result of the hashing as an index into a table of traffic managers to select the target traffic manager to which the received packet is forwarded;
      when packets received from a second network device based on at least a second field in the received packet that is different from the first field by hashing at least the second field in the received packet, employing a second result of the hashing as an index into the table of traffic managers to select the target traffic manager to which the received packet is forwarded, and wherein at least one field used in the hashing to generate the first result is different from fields used in the hashing to generate the second result; and
      forwarding the received packet to the target traffic manager, wherein the received packet from the second network device is forwarded to the same target traffic manager as is the received packet from the first network device.

2. The distributor device of claim 1, wherein the actions further comprises:
   in response to the received packet being associated with a pre-determined group characteristic, selecting the target traffic manager based on a plurality of traffic managers that are partitioned into groups of traffic managers based in part on the pre-determined group characteristics.

3. The distributor device of claim 1, wherein employing the first or the second result of the hashing further includes employing the first or the second result of the hashing to load balance across a plurality of traffic managers.

4. The distributor device of claim 1, wherein the actions further comprises:
   in response to the first field in the received packet being equal to the second field in the received packet, forwarding the received packet to a pre-determined traffic manager.

5. The distributor device of claim 1, wherein the actions further comprises:
   translating source information in the received packet by replacing a source port number in the received packet with a self-source port number that is determined iteratively based on a target traffic manager device identifier.

6. The distributor device of claim 1, wherein the first field and the second field is each at least one of a source IP address or a source port number or at least one of a destination IP address or destination port number.

7. The distributor device of claim 1, wherein determining the target traffic manager further comprises determining the target traffic manager based on the received packet having a source port number that is greater than a destination port number.

8. The distributor device of claim 1, wherein determining the target traffic manager further comprises determining the target traffic manager based on the received packet having a destination port number that is greater than a source port number.

9. The distributor device of claim 1, wherein each of the first field and the second field is a port number.

10. An apparatus for routing network packets, comprising:
    a transceiver that receives and forwards a packet; and
    a processor that executes computer-readable instructions that perform actions, including:
       receiving packets over a high bandwidth logical link in a network, wherein the logical link is based on an aggregation of two or more data channels that are binded together into a single data channel to provide asymmetric level 2 and level 3 packet routing;
       transmitting received packets to a corresponding traffic manager, where:
       when a source port number of a received packet equals a destination port number of the received packet, transmitting the received packet to a predetermined traffic manager;
       when the source port number differs from the destination port number, transmitting the received packet to a target traffic manager based in part on at least one of first packet header information or second packet header information in the respective received packets that are useable in a hash operation to obtain an index result indicative of the corresponding traffic manager within a traffic manager table, wherein at least one of first packet header information is different from the second packet header information used in the hash operation; and transmitting response packets to respective received packets to the same corresponding traffic manager.

11. The apparatus of claim 10, wherein the processor performs actions, further comprising:

determining that the received packet is from a first network device based on a comparison of the first packet header information and the second packet header information.

12. The apparatus of claim 10, wherein the first packet header information further comprises at least one of a source Internet Protocol (IP) address or a source port number, and the second packet header information comprises at least one of a destination IP address or a destination port number.

13. The apparatus of claim 10, wherein if the received packet is associated with a pre-determined group characteristic, selecting the corresponding traffic manager from a plurality of traffic managers that are partitioned into groups of traffic managers based in part on the pre-determined group characteristics.

14. The apparatus of claim 10, wherein determining the result further comprises employing a hash function that is configured to load balance the traffic managers identified within the traffic manager table.

15. The apparatus of claim 10, wherein the processor performs actions, further comprising:

translating information in the received packet by replacing a source port number in the received packet with a self-source port number that is determined iteratively based on a target traffic manager device identifier.

16. The apparatus of claim 10, wherein selecting the corresponding traffic manager further comprises selecting the first packet header information or the second packet header information based on a received packet having a source port number that is greater than a destination port number.

17. The apparatus of claim 10, wherein selecting the corresponding traffic manager further comprises selecting the first packet header information or the second packet header information based on a received packet having a destination port number that is greater than a source port number.

18. The apparatus of claim 10, wherein each of the first packet header information and the second packet header information is a port number.

19. The apparatus of claim 10, wherein the first packet header information and the second packet header information each is at least one of IP, User Datagram Protocol (UDP), or Transmission Control Protocol (TCP) information.

20. A network device that routes packets between a first network device and a second network device on a network, comprising:

memory for storing computer-readable instructions; and a processor that executes the computer-readable instructions to perform actions, including:

receiving a packet over a high bandwidth logical link in a network, wherein the logical link is based on an aggregation of two or more data channels network that are binded together into a single data channel to provide asymmetric level 2 and level 3 packet routing;

when a source port number of the received packet equals a destination port number of the received packet, forwarding the received packet to a predetermined traffic manager;

when the source port number differs from the destination port number, performing other actions, including:

when receiving a packet of a first packet type, forwarding the received packet to a first traffic manager in a plurality of traffic managers selected using in part a first field in the received packet by hashing the first field, employing a first hash result as an index into a table of traffic managers to select the first traffic manager, wherein a response to the received packet is forwarded to the first traffic manager; and when receiving a packet of a second packet type, forwarding the received packet to a second traffic manager in the plurality of traffic mangers selected using in part a second field in the received packet by hashing the second field to obtain a second hash result, employing the second hash result as an index into the table of traffic managers to select the second traffic manager, wherein the response packet to the received packet is forwarded to the second traffic manager, and wherein at least one field used to obtain the first hash result is different from fields used to obtain the second hash result.

21. The network device of claim 20, wherein a packet of the first packet type comprises a packet that includes a source port number that is greater than a destination port number.

22. The network device of claim 20, wherein a packet of the second packet type comprises a packet that includes a destination port number that is greater than a source port number.

23. The network device of claim 20, wherein the processor performs actions, further including:

in response to the first field in the received packet equaling the second field in the received packet, forwarding the received packet to a pre-determined traffic manager.

24. The network device of claim 20, wherein using in part a first field further comprises using a source address and a source port number in the received packet.

25. The network device of claim 20, wherein using in part the second field further comprises using a destination address and a destination port number in the received packet.

26. The network device of claim 20, wherein the processor performs actions, further including:

for information in the received packet that is to be translated, replacing a source port number in the received packet with a self-source port number that is determined iteratively based on a target traffic manager device identifier.

27. The network device of claim 20, wherein each of the first field and the second field is a port number.

28. An apparatus for routing network packets, comprising:

a transceiver that receives a packet over a high bandwidth logical link in a network, wherein the logical link is based on an aggregation of two or more data channels network that are binded together into a single data channel to provide asymmetric level 2 and level 3 packet routing; and means for routing each received packet to a corresponding traffic manager, where:

when a source port number of a received packet equals a destination port number of the received packet, routing the received packet to a predetermined traffic manager; and when the source port number differs from the destination port number, routing the received packet to a target traffic manager based in part on at least one of first packet header information or second packet header information in the received packet to determine a hash useable as an index into a table of traffic managers to select the corresponding traffic manager, wherein a response packet to each received packet is routed to the same corresponding traffic manager, and wherein the hash determined from at least one first packet header information is determined using different input than at least one input used for the hash determined using the second packet header information.

29. The apparatus of claim 28, wherein determining the hash further comprises using at least one of the first packet header information or the second packet header information based on the received packet having a source port number that is greater than a destination port number.

30. The apparatus of claim 28, wherein determining the hash further comprises using at least one of the first packet header information or the second packet header information based on the received packet having a destination port number that is greater than a source port number.

31. The apparatus of claim 28, wherein each of the first packet header information and the second packet header information is a port number.

32. A non-transitory computer-readable storage device that stores computer executable instructions thereon for implementing a distributor capable of routing network packets between network devices, the instructions when executed by at least one processing system causes actions to be performed comprising:

receiving a packet over a high bandwidth logical link in a network, wherein the logical link is based on an aggregation of two or more data channels network that are binded together into a single data channel to provide asymmetric level 2 and level 3 packet routing;

when a source port number of the received packet equals a destination port number of the received packet, forwarding the received packet to a predetermined traffic manager;

when the source port number differs from the destination port number, determining a target traffic manager based on at least a first field in the received packet for packets received from a first network device by hashing at least the first field in the received packet and employing a first result of the hashing as an index into a table of traffic managers to select the target traffic manager to which the received packet is forwarded;

when packets received from a second network device based on at least a second field in the received packet that is different from the first field by hashing at least the second field, employing a second result of the hashing as an index into the table of traffic managers to select the target traffic manager to which the received packet is forwarded, and wherein the first result is generated from at least one field in the received packet that is different from fields employed in generating the second result; and forwarding the received packet, to the target traffic manager, wherein the received packet from the second network device is forwarded to the same target traffic manager as is the received packet from the first network device.

33. The non-transitory computer-readable storage device of claim 32, wherein determining the target traffic manager further comprises determining the target traffic manager based on the received packet having a source port number that is greater than a destination port number.

34. The non-transitory computer-readable storage device of claim 32, wherein determining the target traffic manager further comprises determining the target traffic manager based on the received packet having a destination port number that is greater than a source port number.

\* \* \* \* \*